United States Patent
Alfano et al.

(10) Patent No.: US 8,185,103 B2
(45) Date of Patent: May 22, 2012

(54) CROSS-TECHNOLOGY COVERAGE MAPPING SYSTEM AND METHOD FOR MODULATING SCANNING BEHAVIOUR OF A WIRELESS USER EQUIPMENT (UE) DEVICE

(75) Inventors: Nicholas Alfano, Stratford-Upon-Avon (GB); Vytautas Kezys, Hamilton (CA); Yiu Lam, Waterloo (CA); Richard George, Waterloo (CA); Brian Oliver, Fergus (CA); Mark Pletsch, Toronto (CA); Balaji Gopalan, Guelph (CA); Paul Carpenter, Twickenham (GB)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/113,622

(22) Filed: May 23, 2011

(65) Prior Publication Data

US 2011/0223935 A1 Sep. 15, 2011

Related U.S. Application Data

(63) Continuation of application No. 11/366,705, filed on Mar. 2, 2006, now Pat. No. 7,953,410.

(51) Int. Cl.
*H04W 4/00* (2009.01)
*H04M 1/725* (2006.01)

(52) U.S. Cl. .................. 455/432.3; 455/433; 455/435.1; 455/435.2; 455/414.2

(58) Field of Classification Search ............... 455/435.1, 455/435.2, 432.3, 433, 414.2, 456.3
See application file for complete search history.

(56) References Cited

U.S. PATENT DOCUMENTS

| | | | |
|---|---|---|---|
| 5,974,328 A | 10/1999 | Lee et al. | |
| 6,223,042 B1 | 4/2001 | Raffel | |
| 6,564,055 B1 | 5/2003 | Hronek | |
| 7,167,707 B1 | 1/2007 | Gazzard et al. | |
| 7,277,705 B2 | 10/2007 | Casaccia et al. | |
| 7,277,710 B1 | 10/2007 | Jones et al. | |
| 2002/0082044 A1 | 6/2002 | Davenport | |
| 2004/0116132 A1 | 6/2004 | Hunzinger et al. | |
| 2004/0160918 A1 | 8/2004 | Narasimha | |
| 2004/0242240 A1* | 12/2004 | Lin | 455/456.3 |

FOREIGN PATENT DOCUMENTS

| | | |
|---|---|---|
| EP | 1460873 | 9/2004 |
| WO | 200162034 | 8/2001 |

OTHER PUBLICATIONS

CIPO, Office Action, Application No. 2,580,205, Dec. 14, 2010, 4 pgs.
EPO, Search Report, Application No. 06251149.8, Aug. 11, 2006, 8 pgs.
EPO, Communication pursuant to Article 96(2) EPC, Application No. 06251149.8, Aug. 23, 2007, 6 pgs.

(Continued)

*Primary Examiner* — Un C Cho
(74) *Attorney, Agent, or Firm* — The Danamraj Law Group, P.C.

(57) ABSTRACT

A network node provides coverage information to wireless UE devices from a database that correlates coverage information for a radio access network with geographic area locations. The network node accepts updates to the coverage information for the radio access network via a first interface and downloads coverage information from the database to a wireless user equipment (UE) device via a second interface.

17 Claims, 8 Drawing Sheets

OTHER PUBLICATIONS

EPO, Decision to Grant a European Patent pursuant to Article 97(1) EPC, Application No. 06251149.8, Apr. 2, 2009, 1 pg.
USPTO, Office Action, U.S. Appl. No. 11/366,705, Aug. 20, 2008, 10 pgs.
USPTO, Office Action, U.S. Appl. No. 11/366,705, Feb. 13, 2009, 10 pgs.
USPTO, Office Action, U.S. Appl. No. 11/366,705, May 8, 2009, 10 pgs.
USPTO, Office Action, U.S. Appl. No. 11/366,705, Nov. 23, 2009, 11 pgs.
USPTO, Office Action, U.S. Appl. No. 11/366,705, Aug. 5, 2010, 11 pgs.
CIPO, Office Action, Application No. 2,580,205, Nov. 10, 2011, 3 pgs.

* cited by examiner

| Geographic Area | RAT-1 Coverage | RAT-2 Coverage | RAT-3 Coverage | ... | RAT-n Coverage |
|---|---|---|---|---|---|
| Area-1 | Yes | No | No | ... | Yes |
| Area-2 | No | Yes | Yes | ... | No |
| ... | ... | ... | ... | ... | ... |
| Area-m | Yes | Yes | Yes | ... | |

FIG. 2

| Radio Access Technology A e.g. GSM | Radio Access Technology B e.g. WLAN | Radio Access Technology C e.g. UMTS | Geographic Area |
|---|---|---|---|
| RAN ID 304A | RAN ID 304B | RAN ID 304C | |
| IDa | IDk | IDc | Area-1 |
| IDc | IDa | | Area-2 |
| IDh | IDd | | Area-3 |
| IDb | IDb | | Area-4 |

*FIG. 3A*

| Geographic Area | Allowed frequencies, bands and/or channels for different RATs | Forbidden frequencies, bands and/or channels for different RATs |
|---|---|---|
| Area-a [{{Long1a, Lat1a};{Long2a, Lat2a};{Long3a, Lat3a;{Long4a, Lat4a}}] | A-B, C-D | X, Y |
| Area-b [{{Long1b, Lat1b};{Long2b, Lat2b};{Long3b, Lat3b;{Long4b, Lat4b}}] | E-F, H-J | X, Y, L, M |
| Area-c [{{Long1c, Lat1c};{Long2c, Lat2c};{Long3c, Lat3c}}] | J, K, L | A-B |
| ... | ... | ... |

*FIG. 3B*

CROSS-TECHNOLOGY COVERAGE MAPPING SYSTEM AND METHOD FOR MODULATING SCANNING BEHAVIOUR OF A WIRELESS USER EQUIPMENT (UE) DEVICE

CROSS REFERENCE TO RELATED APPLICATION(S)

This non-provisional application is a continuation application of U.S. patent application Ser. No. 11/366,705, entitled "CROSS-TECHNOLOGY COVERAGE MAPPING SYSTEM AND METHOD FOR MODULATING SCANNING BEHAVIOR OF A WIRELESS USER EQUIPMENT (UE) DEVICE", filed Mar. 2, 2006, which discloses subject matter related to the subject matter disclosed in the following commonly owned co-pending U.S. patent application(s): (i) "SYSTEM AND METHOD FOR ACCELERATING NETWORK SELECTION BY A WIRELESS USER EQUIPMENT (UE) DEVICE USING SATELLITE-BASED POSITIONING SYSTEM," filed Jul. 1, 2005; application Ser. No. 11/173,040, in the name(s) of: Adrian Buckley and Gregory Scott Henderson; and (ii) "SYSTEM AND METHOD FOR ACCELERATING NETWORK SELECTION BY A WIRELESS USER EQUIPMENT (UE) DEVICE," filed Jul. 1, 2005; application Ser. No. 11/173,083, in the name(s) of: Adrian Buckley, Andrew Allen and Gregory Scott Henderson. The entire content of each of the foregoing applications is incorporated herein by reference.

FIELD OF THE DISCLOSURE

The present patent disclosure generally relates to communication networks. More particularly, and not by way of any limitation, the present patent application is directed to a cross-technology coverage mapping system and method for modulating scanning behavior of a wireless user equipment (UE) device disposed in a radio network environment.

BACKGROUND

When a wireless user equipment (UE) device is first powered up or when it tries to recover from loss of coverage, it is typically required to search for its last registered Public Land Mobile Network (RPLMN) in every supported radio access technology and frequency bands associated therewith before attempting to register on another PLMN. The issue for operators is that when a UE device loses coverage from its home PLMN, it may have to perform a full band scan (FBS) of all supported bands before possibly selecting a National Roaming Partner (NRP). Today, such a full scan already takes a fairly long time in a dense or complex radio environment, which will be further exacerbated when additional frequency bands are introduced and more access technologies (e.g., Wireless Local Area Network (WLAN) technologies) are integrated.

In addition, it is important to note that in most scenarios a full band scan can give rise to inefficient utilization of radio resources as well as battery power of a device. Relatedly, the time to perform a full scan may be so long that the radio environment may have changed significantly between the time when the scan was started and the time the UE device decides to select a new PLMN, for example, due to roaming. As a result, by the time the UE decides to select a new network, coverage of a high priority or more optimal network may have become available.

SUMMARY

Broadly, the present disclosure is directed to a cross-technology coverage mapping system and method suitable for modulating scanning behavior of a wireless UE device in a radio network environment. In one exemplary embodiment, the wireless UE device is operable to determine its geographic area location. A logic module of the wireless UE device is adapted for interrogating a database to determine which radio access technologies (RATs) have coverage in the geographic area location. Responsive to the interrogation, scanning by the wireless UE device is restricted to only those RATs that have coverage in the particular geographic area.

In one aspect, the present disclosure is directed to a method for modulating scanning behavior of a wireless UE device, comprising at least one or more of the following: determining a geographic area location as to where the wireless UE device is located; interrogating a database to determine which RATs have coverage in the geographic area location; and based on the interrogating, restricting scanning by the wireless UE device to only those RATs that have coverage in the geographic area location.

In another aspect, the present disclosure is directed to wireless UE device operable to modulate its scanning behavior, comprising at least one or more of the following: a logic module adapted for determining a geographic area location as to where the wireless UE device is located; a logic module adapted for interrogating a database to determine which RATs have coverage in the geographic area location; and a logic module, responsive to the interrogating, for restricting scanning by the wireless UE device to only those RATs that have coverage in the geographic area location.

In a still further aspect, the present disclosure is directed to a system for modulating scanning behavior of a wireless UE device, comprising at least one or more of the following: means for determining a geographic area location as to where the wireless UE device is located; means for interrogating a database to determine which RATs have coverage in the geographic area location; and means, responsive to the interrogating, for restricting scanning by the wireless UE device to only those RATs that have coverage in the geographic area location.

BRIEF DESCRIPTION OF THE DRAWINGS

A more complete understanding of the embodiments of the present patent disclosure may be had by reference to the following Detailed Description when taken in conjunction with the accompanying drawings wherein:

FIG. 2 depicts an exemplary embodiment of a technology coverage database in accordance with the teachings of the present patent disclosure;

FIGS. 3A and 3B depict further exemplary embodiments of a technology coverage database in accordance with the teachings of the present patent disclosure;

DETAILED DESCRIPTION OF THE DRAWINGS

Figure 1:
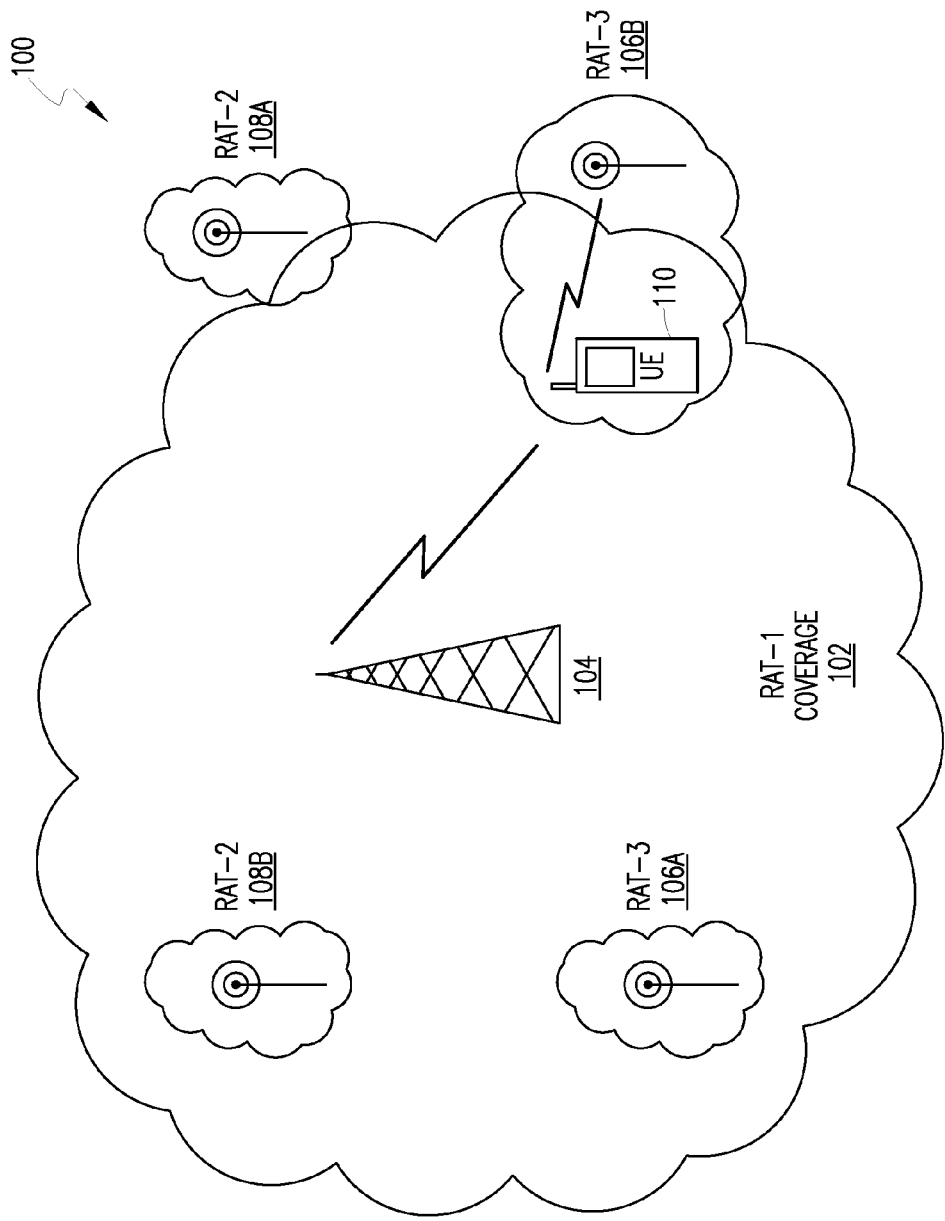
FIG. 1 depicts a generalized network environment wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized radio network environment 100 wherein one or more embodiments of the present patent disclosure may be practiced. A generalized wireless user equipment (UE) or mobile equipment (ME) device 110 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation and in a number of frequency bands and/or radio access technologies (RATs). For example, UE/ME device 110 may operate in the cellular telephony band frequencies as well as Wireless Local Area Network (WLAN) bands. Further, other bands in which the UE device could operate wirelessly may comprise Wi-Max bands or one or more satellite bands. Accordingly, for purposes of the present patent disclosure, those skilled in the art should recognize that the term "UE device" or "wireless device" may comprise a mobile equipment (ME) device (with or without any removable storage module or RSM such as a Universal Subscriber Identity Module (USIM) card, Removable User Identity Module (RUIM) card, a Subscriber Identity Module (SIM) card, or a compact Flash card, etc.) as well as other portable wireless information appliances, also with or without such RSMs.

By way of illustration, the radio network environment 100 may be envisioned as comprising multiple, possibly overlapping, communication spaces capable of providing service to UE device 110 in a number of RATs, depending on available technology coverage and the capabilities of the UE device. Reference numeral 102 refers to a RAT coverage space that is illustrative of a wide area cellular network (WACN) space accessible in a particular RAT, designated as RAT-1, wherein suitable infrastructure such as, e.g., a base station tower 104 may be deployed. It should be apparent that there may exist any number of Public Land Mobile Networks (PLMNs) in the WACN space 102 that are operable to provide cellular telephony services which may or may not include packet-switched data services. Depending on the coverage area(s) and whether the user is roaming, WACN space 102 may exemplify one or more home networks (i.e., home PLMNs or HPLMNs, or equivalent HPLMNs or EHPLMNs) and visited networks (i.e., VPLMNs), each with additional infrastructure such as Home Location Register (HLR) nodes, Mobile Switching Center (MSC) nodes, and the like, although not shown herein. Accordingly, by way of generalization, the RAT-1 coverage space 102 exemplifying a WACN space may comprise one or more radio access networks (RANs) compliant with at least one of General Packet Radio Service (GPRS) networks, Enhanced Data Rates for GSM Evolution (EDGE) networks (i.e., GSM EDGE RANs or GERANs), Integrated Digital Enhanced Networks (IDENs), Code Division Multiple Access (CDMA) networks, Time Division Multiple Access (TDMA) networks, Universal Mobile Telecommunications System (UMTS) networks, or any $3^{rd}$ Generation Partnership Project (3GPP)-compliant network (e.g., 3GPP or 3GPP2), all operating with well known frequency bandwidths and protocols.

Further, UE device 110 is operable to scan in other RATs as well, e.g., using one or more generic access networks (GANs) as well as any type of WLAN arrangements. One or more such RATs are operable to provide short-range wireless connectivity to UE device 110 via access points (APs) or "hot spots," and may preferably operate with a variety of standards, e.g., IEEE 802.11b, IEEE 802.11a, IEEE 802.11g, HiperLan and HiperLan II standards, Wi-Max standard (IEEE 802.16 and IEEE 802.16e), OpenAir standard, and the Bluetooth standard (IEEE 802.15). By way illustration, reference numerals 108A and 108B refer to two AP coverage areas in using a particular RAT, designated as RAT-2, that may be part of a WLAN operated by an enterprise, business, or any other entity. Likewise, reference numerals 106A and 106B refer to two AP coverage areas in using another RAT, designated as RAT-3, that may be part of yet another WLAN arrangement.

As alluded to in the foregoing sections, UE 110 is operable to scan in multiple RATs using applicable bands and frequencies, either as an initial scanning process or as a background scanning process. Accordingly, because which RATs may overlap is dependent on a particular geographic location, UE 110 may modulate its scanning behavior based on where it is located by using a cross-technology coverage database scheme that is set forth below in additional detail.

In essence, a scheme is provided that allows for recording of the areas or locations where there is overlapping coverage of two or more RANs/RATs. Information from available networks is captured in a database to build a map with respect to overlapping coverage areas. For example, the information may be a set of identifying values for each network or RAT. In one embodiment, these values for overlapping coverage may be correlated to create a map of which networks have shared coverage with which other networks. By way of exemplary implementation, cell identifier information may be utilized in cross-correlating such overlapping coverage for different networks and technologies. For instance, as is well known, each of the wide area cellular PLMNs may be arranged as a number of cells, with each cell having sectors (e.g., typically three 120-degree sectors per base station (BS) or cell). Each individual cell may be provided with an identifier, e.g., a cell global identity or CGI parameter in GSM networks, to identify them. Also in GSM, a group of cells is commonly designated as a Location Area (LA) and may be identified by an LA Identifier (LAI). At the macro level, the PLMNs may be identified in accordance with the underlying cellular technology. Continuing with the GSM technology as an example, a GSM-based PLMN may be identified by an identifier comprised of a combination of a mobile country code (MCC) and a mobile network code (MNC). On the other hand, CDMA/TDMA-based PLMNs may be identified by a System Identification (SID) parameter and/or a Network Identification (NID) parameter. Regardless of the cellular infrastructure, all cells broadcast the macro level PLMN identifiers such that a wireless device (e.g., UE device 110) wishing to obtain service can identify the wireless network.

Similarly, coverage areas of various WLANs may also be identified using values such as Service Set Identifiers (SSIDs) or Extended SSIDs (ESSIDs). For instance, continuing to refer to FIG. 1 as an illustrative example, each RAT-2 and RAT-3 coverage area in the radio network environment 100 may be identified with a corresponding SSID/ESSID, wherein one or more WLANs may share coverage with RAT-1 space 102. Accordingly, a cell identifier for RAT-1 102 may be correlated with SSID information for the RAT-2 and RAT-3 areas when the technologies co-exist in the same area. This information may be utilized by UE 110 to modulate its scanning behavior (e.g., scan in only those RATs that have been ascertained to be available in a geographic area and skip scanning on other RATs although the device have the capability to do so).

FIG. 2 depicts an exemplary embodiment of technology coverage database 200 comprising cross-technology mapping between geographic location data and coverage data in accordance with the teachings of the present patent disclosure. A geographic area/location column 202 identifies various geographic areas (Area-1 through Area-m) that are of interest with respect to developing a coverage map. For each geographic area, an indication is provided whether or not a particular RAT/RAN has coverage thereat. Thus, coverage information for a plurality of RATs (RAT-1 coverage 204-1 through RAT-n coverage 204-$n$) may be recorded on an area-by-area basis in the database 200. As an example, Area-1 has coverage with respect to networks operating in RAT-1 and RAT-n, but no coverage with respect to RAT-2 and RAT-3 networks. Accordingly, when it is determined that a UE device is in Area-1, it can advantageously skip scanning in RAT-2 and RAT-3 bands, thereby saving battery power and extending battery life. Also, because only a subset of RATs are scanned, network selection by the UE device can be accelerated as well.

Referring to FIGS. 3A and 3B, depicted therein are further exemplary embodiments of a technology coverage database of the present disclosure. The database embodiment 300A of FIG. 3A illustrates cross-correlations among a plurality of radio access technologies, e.g., GSM technology 302A, WLAN technology 302B, and UMTS technology 302C, wherein a number of RAN IDs are provided for each technology for a particular geographic area 306. As illustrated, column 304A identifies multiple RAN IDs for the GSM technology. Likewise, columns 304B and 306C are provided for the WLAN and UMTS technologies, respectively, with the corresponding RAN ID values. As pointed out earlier, the various IDs can be SSID/ESSID values (for WLAN), SIDs (for IS-95 and IS-136), or [MCC,MNC] combinations (for GSM). Accordingly, if a UE device determines that GSM coverage with IDa is available, it can interrogate the database structure 300A to determine that WLAN coverage (with network IDk) as well as UMTS coverage (with network IDc) is also available in Area-1.

The database embodiment 300B of FIG. 3B illustrates another mapping arrangement that correlates geographic area information with technology coverage information. As illustrated, a number of geographic areas 352 are preferably configurably defined, each area having three or more corners that may be specified in terms of longitude/latitude coordinate pairs. Associated with each geographic area is a list of allowed frequencies, bands and/or channels, i.e., allowed frequency data 354, that a wireless UE device may use for selective scanning on a RAT-by-RAT basis for available RATs in that area. In a further modification, at least a portion of the geographic areas 352 may also be associated with a list of forbidden frequencies, bands and/or channels, i.e., disallowed frequency data 356, that a wireless UE device is barred from using for different RATs in that area. Those skilled in the art should recognize upon reference hereto that the database structure 300B is capable of a number of modifications and variations such as, e.g., providing only allowed frequency data, different areas for allowed frequency data and disallowed frequency data, as well as interfacing with a number of other database structures described hereinabove.

By way of example, a four-corner geographic area, Area-a, is defined in terms of four longitude/latitude pairs: [{Long1a, Lat1a}; {Long2a, Lat2a}; {Long3a, Lat3a}; {Long4a, Lat4a}], wherein each pair corresponds to a corner. Likewise, a triangular geographic area, Area-c, is defined in terms of three longitude/latitude pairs: [{Long1c, Lat1c}; {Long2c, Lat2c}; {Long3c, Lat3c}]. Clearly, geographic areas of various other shapes may also be defined in a similar manner for purposes of the present patent disclosure, wherein lines connecting one corner point to the adjacent corner points determine the boundaries of the areas. In a yet another implementation, the geographic areas may simply be coordinates indicative of the wireless device's position that is determined using a satellite-based positioning system (SBPS) such as the Global Positioning System (GPS).

It will be recognized that providing GPS coordinates within a cross-technology coverage database may add further granularity to the determination of geographic area location information. Additional embodiments of a cross-technology coverage database may include capabilities and features such as, e.g., (i) coverage information being added from other sources (network operators, for instance); (ii) providing preferred and/or barred RAT(s) in a specific geographic area based on cost, quality, user/network preference, et cetera; (iii) quality metrics such as Received Signal Strength Indicator (RSSI) information for different RAT(s) in a specific geographic area; (iv) adaptive knowledge acquisition such as keeping track of the number of successful and failed attempts at accessing a specific RAT from a location area; (v) a time log of each successful/unsuccessful attempt at accessing a particular RAN; and (vi) additional filtering, prioritization schemes (if multiple RATs are available), and selection criteria for different RAT(s) in an area.

Furthermore, in a yet another implementation, an embodiment of the cross-technology coverage mapping database may be provided with an interface that allows it to be offered as a commercial service to companies deploying WLAN hot spots. Accordingly, a WLAN operator may provide information regarding its hot spot(s) and their geographic location to a database service without a multi-mode UE device actually having to discover the WLAN's existence. The coverage mapping database may also be provisioned with a mechanism to determine if the data for a given location area is stale. An update algorithm may also be provided to ensure that the coverage mapping data does not become out-of-date. Relatedly, the updating algorithm may be a function of the number of inquiries per a specified time period (e.g., a day) for a given location.

As an additional variation on the methodology of collecting information on WLAN hot spots, a currently accessed WLAN may be provided with the capability to inform the accessing UE device of known neighboring WLAN hot spots and their geographic information. Accordingly, a UE device could update the coverage mapping database with additional local WLAN coverage areas although it may not be physically located within the range of these neighboring access points.

Figure 4:
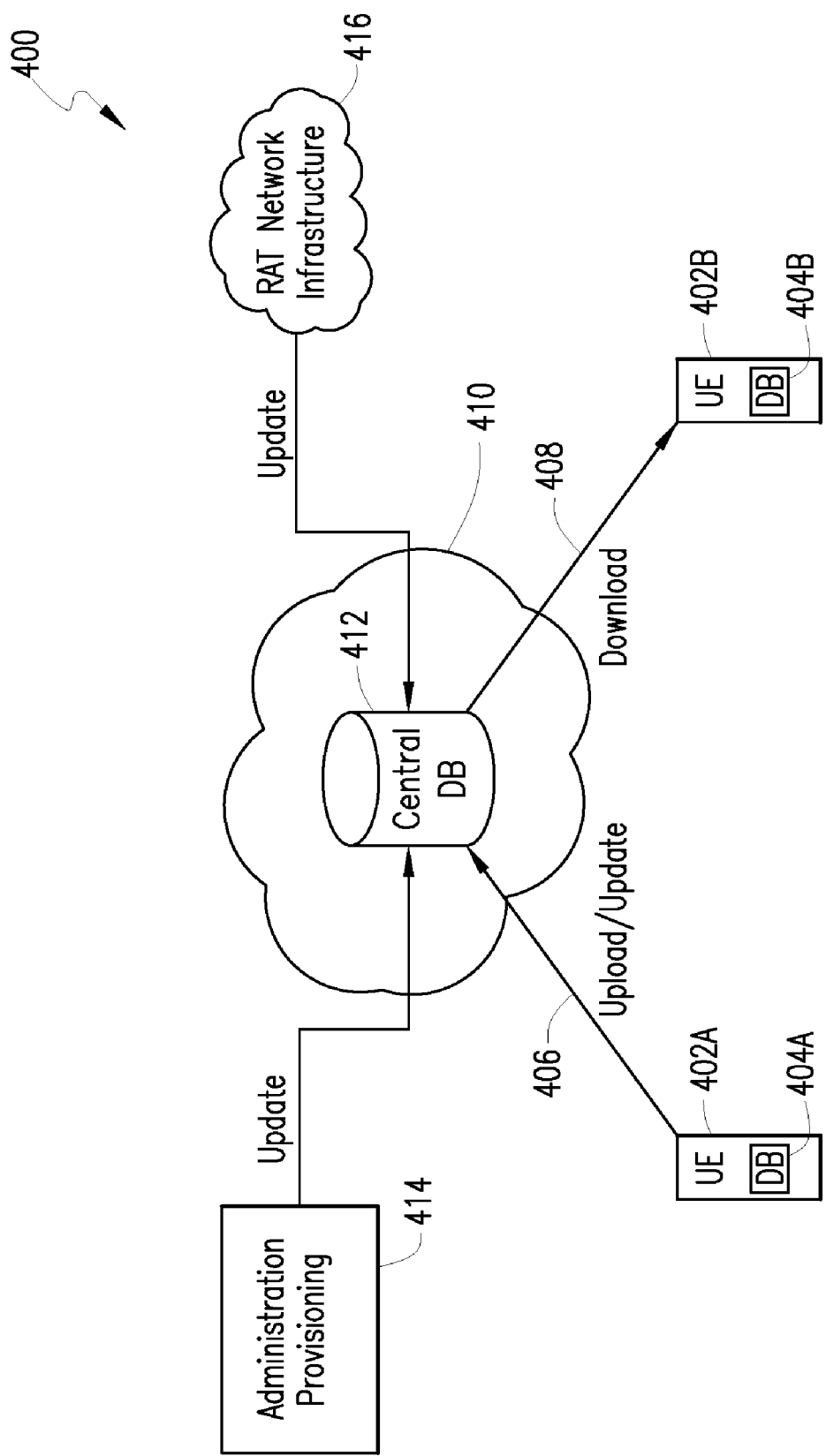
FIG. 4 depicts an exemplary architecture for providing a technology coverage database.

Regardless of the various extensions, modifications, applications, and implementations described above, it should be recognized that a cross-technology coverage database may be provided as local database (i.e., associated with the UE device either in its memory or RSM) or provisioned as a centralized database on a network. FIG. 4 depicts an exemplary architecture for providing an embodiment of a centralized cross-technology coverage database 412. As illustrated, the database 412 provisioned with cross-technology coverage mapping data may be disposed in a network 410 that is accessible to various UE devices, administrative/provisioning nodes as well as other RAT (cellular and/or WLAN) network infrastructure. By way of example, UE 402A and 402B, each with corresponding local databases 404A and 404B, are adapted to interface with the central database 412. Further, UE 402A is adapted, responsive to a predetermined criterion, to upload and/or update the information of the central database 412 via an upload interface 406. On the other hand, UE 402B may be able to download at least a portion of the central database 412 into its local database 404B via interface 408, which may be based on the location of UE 402B. Reference numerals 414 and 416 refer to exemplary administrative network nodes and RAT network infrastructure, respectively, that are adapted to update the central database 412 based on an update algorithm.

Figure 5A:
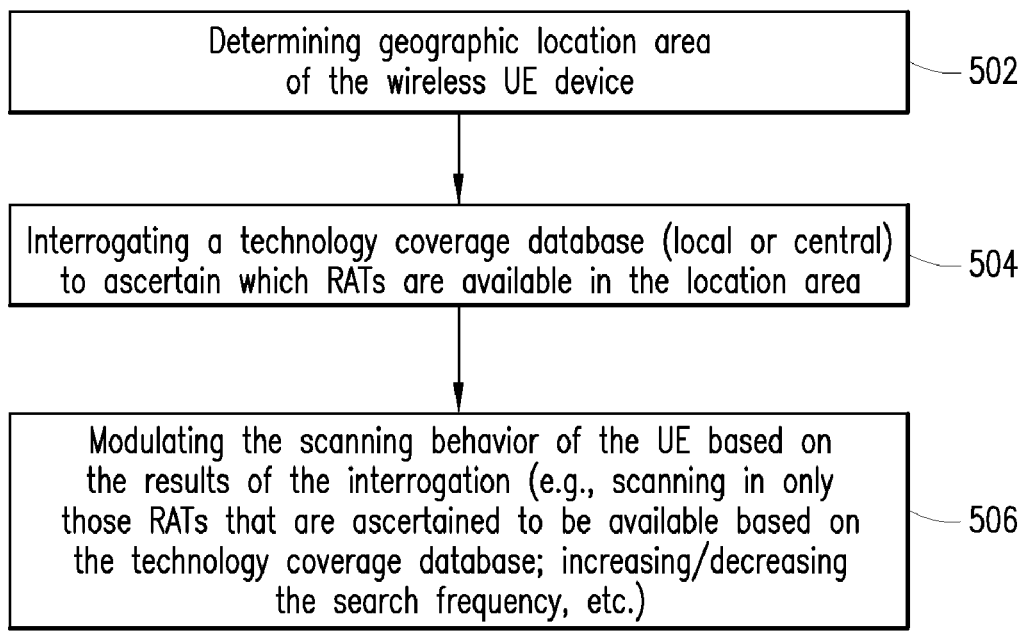
FIG. 5A is a flowchart of a method according to one embodiment of the present disclosure.

Referring now to FIG. 5A, shown therein is a flowchart of a method according to an embodiment of the present disclosure. Upon determining geographic area location information of a wireless UE device (block 502), a technology coverage database (either central or local) is interrogated by the device to determine which RATs have coverage available in the geographic area (block 504). As alluded to previously, the location may be determined in a number of ways, including, e.g., where the device is operable to derive its location based on triangulation between WLAN AP locations in the coverage database. Based on the results of the interrogation, the scanning behavior of the UE device (i.e., its scanning algorithm) is modulated, e.g., restricting scanning in only those RATs that have coverage in the geographic area (block 506). Alternatively or additionally, if the UE device senses one technology only, it may increase or decrease the frequency of searches for an alternate technology if the database query indicates that the alternate technology was previously seen in that geographic location.

Figure 5B:
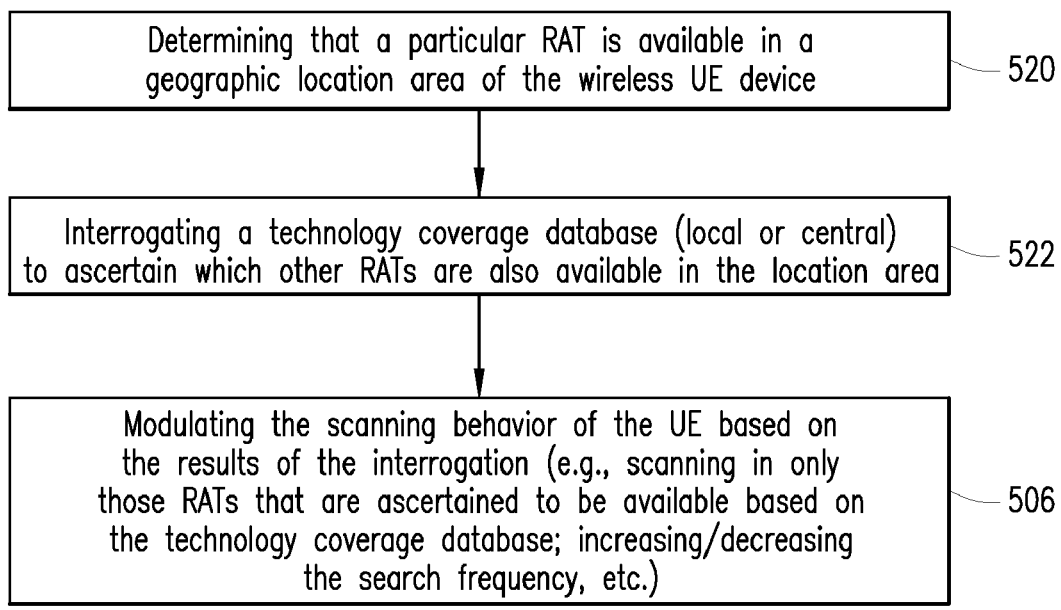
FIG. 5B is a flowchart of a method according to another embodiment of the present disclosure.

FIG. 5B illustrates a flowchart of another variation according to an embodiment of the present disclosure. Upon determining that a particular RAT is available in a geographic area of a wireless UE device (block 520), a technology coverage database (either central or local) is interrogated by the device to determine which other RATs are also available in that location (block 522). The interrogation results may be utilized in modulating the scanning algorithm of the UE device as described hereinabove.

Figure 6:
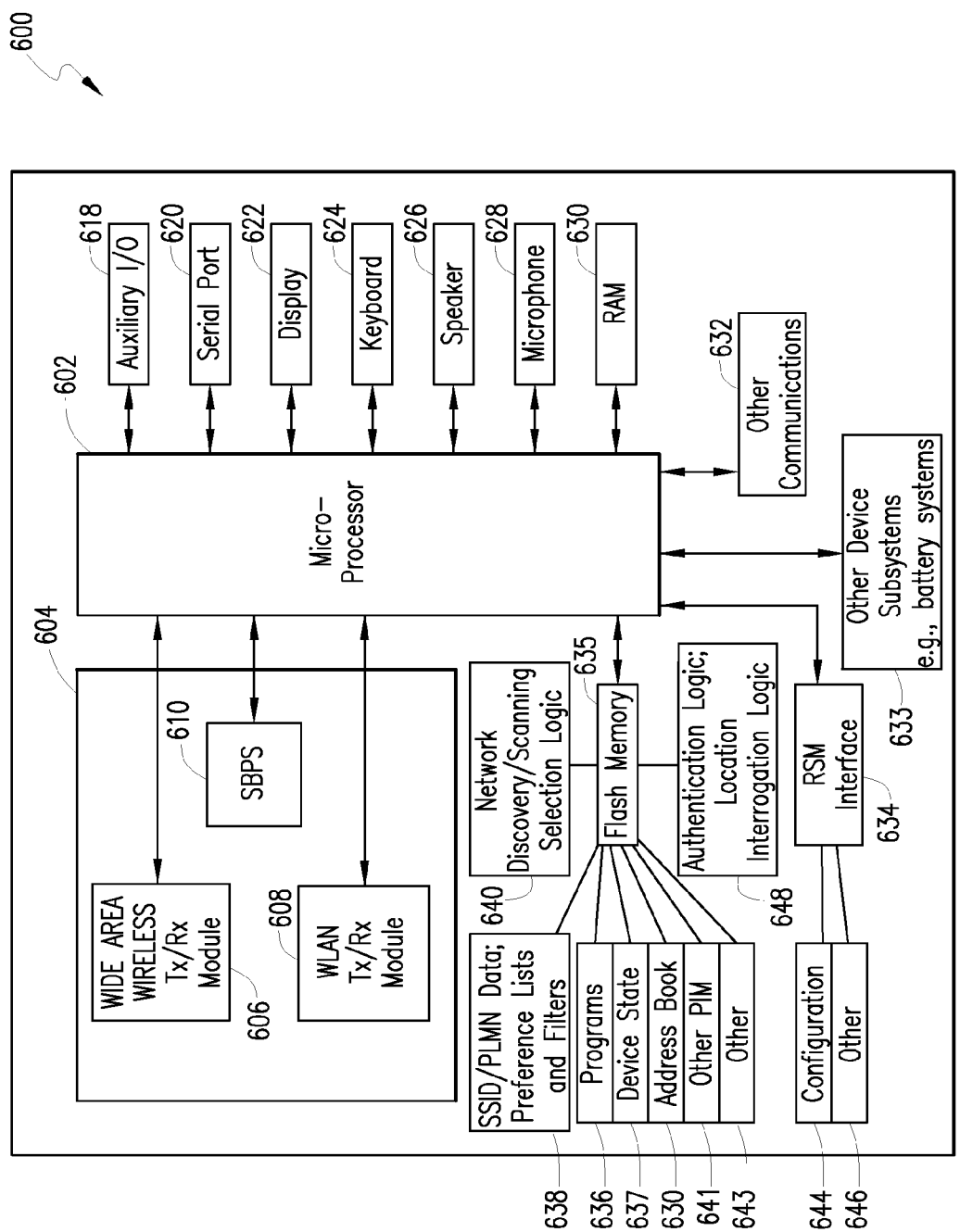
FIG. 6 depicts a block diagram of an embodiment of a wireless UE device operable according to the teachings of the present patent disclosure.

FIG. 6 depicts a block diagram of an embodiment of a wireless device or UE/ME device 600 operable to modulate its scanning behavior according to the teachings of the present patent disclosure. It will be recognized by those skilled in the art upon reference hereto that although an embodiment of UE 110 may comprise an arrangement similar to one shown in FIG. 6, there can be a number of variations and modifications, in hardware, software or firmware, with respect to the various modules depicted. Accordingly, the arrangement of FIG. 6 should be taken as illustrative rather than limiting with respect to the embodiments of the present patent disclosure. A microprocessor 602 providing for the overall control of UE 600 is operably coupled to a communication subsystem 604 which includes transmitter/receiver (transceiver) functionality for effectuating multi-mode scanning and communications over a plurality of bands. By way of example, a wide area wireless Tx/Rx module 606 and a wireless WLAN Tx/Rx module 608 are illustrated. Also, a suitable SBPS/GPS receiver module 610 is provided for effectuating satellite-based location determination for purposes as described hereinabove. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 604 may be dependent upon the communications networks with which the UE device is intended to operate. In one embodiment, the communication subsystem 604 is operable with both voice and data communications.

Microprocessor 602 also interfaces with further device subsystems such as auxiliary input/output (I/O) 618, serial port 620, display 622, keyboard 624, speaker 626, microphone 628, random access memory (RAM) 630, a short-range communications subsystem 632, and any other device subsystems, including battery or standby power systems, generally labeled as reference numeral 633. To control access, an RSM (SIM/RUIM/USIM) interface 634 is also provided in communication with the microprocessor 602. In one implementation, RSM interface 634 is operable with an RSM card having a number of key configurations 644 and other information 646 such as identification and subscriber-related data as well as one or more SSID/PLMN lists, coverage databases and filters described in detail hereinabove.

Operating system software and other control software may be embodied in a persistent storage module (i.e., non-volatile storage) such as Flash memory 635. In one implementation, Flash memory 635 may be segregated into different areas, e.g., storage area for computer programs 636 as well as data storage regions such as device state 637, address book 639, other personal information manager (PIM) data 641, and other data storage areas generally labeled as reference numeral 643. Additionally, appropriate network discovery/selection logic 640 may be provided as part of the persistent storage for executing the various network discovery/scanning and scanning modulation procedures set forth in the preceding sections. Additionally or alternatively, another logic module 648 is provided for facilitating home network authentication (where implemented), location interrogation, etc. Associated therewith is a storage module 638 for storing the SSID/PLMN lists, location-based selection/scanning filters, capability indicators, et cetera, also described in detail hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method, operable at a network node, for providing coverage information to a wireless UE device, comprising:
   providing a database that correlates coverage information for a plurality of radio access networks operating in a plurality of radio access technologies with geographic area locations;
   accepting administrative updates to the database via a first interface;
   accepting updates to the coverage information for a first radio access network via a second interface; and
   downloading coverage information from the database to a wireless user equipment (UE) device via a third interface.

2. The method for providing coverage information to a wireless UE device as recited in claim 1, wherein the coverage information downloaded to a UE device is based on the geographic area location of the UE device.

3. The method for providing coverage information to a wireless UE device as recited in claim 2, further comprising providing a UE device that is accessing the network node from an access point of the first radio access network with neighboring access points and associated geographic locations.

4. The method for providing coverage information to a wireless UE device as recited in claim 1, further comprising receiving updates to coverage information for the first radio access network from a UE device via a fourth interface.

5. The method for providing coverage information to a wireless UE device as recited in claim 1, wherein the updates to coverage information for the first radio access network are received from a network operator of the first radio access network.

6. The method for providing coverage information to a wireless UE device as recited in claim 1, wherein the first radio access network is one of a generic access network and a wireless local area network.

7. The method for providing coverage information to a wireless UE device as recited in claim 1, further comprising determining that data for a given location area is stale.

8. The method for providing coverage information to a wireless UE device as recited in claim 1, further comprising wherein the database further provides a time log of successful and unsuccessful attempts to access a particular radio access network.

9. A network node, comprising:
a database that correlates coverage information for a plurality of radio access networks operating in a plurality of radio access technologies with geographic area locations;
a first interface for accepting administrative updates to the database;
a second interface operable to receive updates to the coverage information from a first radio access network; and
a third interface operable to download information from the database to a user equipment (UE) device.

10. The network node as recited in claim 9, wherein the coverage information downloaded to a UE device is based on the geographic area location of the UE device.

11. The network node as recited in claim 10, wherein the network node is operable to provide a UE device that is accessing the network node via an access point of the first radio access network with neighboring access points and associated geographic locations.

12. The network node as recited in claim 9, further comprising a fourth interface operable to receive updates to the coverage information for the first radio access network from a UE device.

13. The network node as recited in claim 9, wherein updates to coverage information for the first radio access network are received from a network operator of the first radio access network.

14. The network node as recited in claim 9, wherein the first radio access network is one of a generic access network and a wireless local area network.

15. A method operable on a wireless user equipment (UE) device, the method comprising:
using a first interface to download, from a network node, coverage information for a plurality of radio access networks, which operate in a plurality of access technologies, correlated with geographic location;
storing the downloaded information in a local database; and
using a second interface to upload, to the network node, updates to the coverage information for a first radio access network of the plurality of radio access networks.

16. The method as recited in claim 15, further comprising while accessing the network node from an access point of a first radio access network, receiving information regarding neighboring access points of the first radio access network and associated geographic locations.

17. The method as recited in claim 15, further comprising accessing the radio access network using the downloaded coverage information.

* * * * *